United States Patent
Bergsrud et al.

(10) Patent No.: US 11,970,260 B2
(45) Date of Patent: Apr. 30, 2024

(54) ACTIVE AND PASSIVE SAIL FOR IMPROVED COMMUNICATION NETWORKING AT SEA

(71) Applicant: The United States of America, as represented by the Secretary of the Navy, Crane, IN (US)

(72) Inventors: Corey Bergsrud, Bloomington, IN (US); Katherine Grace Pfeiffer, Bloomington, IN (US); Edward Zipperle, Washington, IN (US); Michael Combs, Bloomfield, IN (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 88 days.

(21) Appl. No.: 17/507,031

(22) Filed: Oct. 21, 2021

(65) Prior Publication Data

US 2022/0126961 A1   Apr. 28, 2022

Related U.S. Application Data

(60) Provisional application No. 63/104,039, filed on Oct. 22, 2020.

(51) Int. Cl.
*H01Q 1/34* (2006.01)
*B63H 9/067* (2020.01)
(Continued)

(52) U.S. Cl.
CPC ............. *B63H 9/067* (2020.02); *H01Q 15/14* (2013.01); *H04B 1/0003* (2013.01); *B63B 2203/00* (2013.01); *H01Q 21/00* (2013.01)

(58) Field of Classification Search
CPC .......... B63B 2035/009; B63B 2203/00; B63B 45/04; B63H 9/06; B63H 9/0635;
(Continued)

(56) References Cited

U.S. PATENT DOCUMENTS 4,497,272 A * 2/1985 Veazey .................. B63H 9/069
                                                244/32
5,977,918 A * 11/1999 Sirmalis .................... H01Q 3/26
                                                343/709
(Continued)

*Primary Examiner* — Tho G Phan
(74) *Attorney, Agent, or Firm* — Naval Surface Warfare Center, Crane Division; Christopher Feigenbutz

(57) ABSTRACT

Provided is a radar and communications enhanced sail for a sailboat, sail ship, or sail drone. The sail includes a first sail section comprising an active communication system, a second sail section comprising a passive communication system, or a combination thereof. The active communication system includes an antenna array (transceiver) and a software-defined radio (SDR), while the passive communication system comprises a reflective panel or sections and/or array of reflector panels or sections. The active system utilizes its SDR and transceiver to communicate back and forth with an onshore SDR and transceiver to provide information as necessary. The passive system receives a radar signal via the reflective material on the sail and reflects the signal back at the radar, which produces a radar cross section indicating that there is an object (in this case the sailboat) in the ocean.

4 Claims, 5 Drawing Sheets

(51) Int. Cl.
*H01Q 15/14* (2006.01)
*H01Q 21/00* (2006.01)
*H04B 1/00* (2006.01)

(58) Field of Classification Search
CPC .......... B63H 9/067; H01Q 1/34; H01Q 15/14; H01Q 21/00; H04B 1/0003; G01S 13/04; G01S 13/90
See application file for complete search history.

(56) References Cited

U.S. PATENT DOCUMENTS

| | | | |
|---|---|---|---|
| 6,037,909 A * | 3/2000 | Cherrette | H01Q 21/0087 343/915 |
| 6,225,940 B1 * | 5/2001 | Ohlsen | H01Q 15/14 441/35 |
| 7,331,311 B2 | 2/2008 | Hurwitz | |
| 9,423,495 B1 * | 8/2016 | Chang | G01S 13/0218 |
| 11,084,561 B2 * | 8/2021 | Jenkins | B63H 9/061 |
| 11,628,915 B1 * | 4/2023 | McNulty | B63H 9/04 701/21 |
| 2022/0055725 A1 * | 2/2022 | Curchod | B63H 9/08 |

* cited by examiner

ACTIVE AND PASSIVE SAIL FOR IMPROVED COMMUNICATION NETWORKING AT SEA

CROSS-REFERENCE TO RELATED APPLICATIONS

The present application claims priority to U.S. Provisional Patent Application Ser. No. 63/104,039, filed Oct. 22, 2020, entitled "ACTIVE AND PASSIVE SAIL FOR IMPROVED COMMUNICATION NETWORKING AT SEA," the disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 200,615US02) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The field of invention relates generally to sailboats. More particularly, it pertains to embedding active/passive electromagnetic systems into the sail of a sailboat in support of improving communication networking in maritime environment.

BACKGROUND

Marine traffic encompasses the monitoring of all ships at sea. Ships are typically classified based on their purpose, size, and type of cargo. Non-limiting examples of classifications include tankers, naval ships, container ships, fishing boats, and passenger ships. Vessel traffic service (VTS) is tasked with tracking marine traffic in an equivalent way to that of the air traffic control system that monitors aircraft. VTS are controlled by harbor or port authorities and are designed to improve the safety and efficiency of maritime traffic. One class of marine craft that is difficult to track include sailboats, which are not entirely radar-visible on open water. A reason for tracking difficulty is that sailboats, compared to standard ships, are quite small and do not show up on radar well or at all, increasing the risk for the sailboat and other ships that may collide with it. Thus, a system is required in order to prevent collisions at sea and to improve the visibility of small vessels like sailboats.

Additionally, modern military forces depend heavily on electromagnetic (EM) systems for surveillance, weapon control, communication, deception, and navigation; thus access to, and control of the EW spectrum is vital. One related use includes decoys, which are a class of physically small radar targets whose radar cross sections (RCS) are generally enhanced by using reflectors. A decoy does not interfere with the operation of the radars tracking it, but rather seeks to attract the attention of those radars, causing them to either acquire and attack it or to transfer the tracking focus. In general, the mission of a decoy is to 1) saturate enemy defenses; 2) cause an enemy to switch an attack from the intended target to the decoy; and 3) cause an enemy to expose his offensive assets by preparing to attack a decoy.

Finally, a developing area of interest relates to sail drones. Most sail drones are currently used in competitions or are used for environmental research out on the open ocean. The reason that sail drones are starting to become a viable option for uncrewed vehicles or vessels at sea is because they offer a low power, low cost, low maintenance option for prolonged environmental monitoring. Sail drones can be powered via wind propulsion and hybrid energy systems. As autonomous vessels operating in the sea start to become more prevalent it is important to understand how to manage them. Currently, commercial ships use Automatic Identification System (AIS) to communicate their location, speed, heading, and destination. It is important for sail drones to have enhanced communication and identification capabilities at range so they can become more visible at range thus reducing potential collisions. As such, there is a need for improving the radar- and radio-frequency (RF)-based visibility of a sailboat.

SUMMARY OF THE INVENTION

The present invention relates to a radar and communications enhanced sail for a sailboat, sail ship, or sail drone. The sail includes a first sail section comprising an active communication system, a second sail section comprising a passive communication system, or a combination thereof. The active communication system includes an antenna array and a software-defined radio, wherein the passive communication system comprises a reflective panel or sections and/or array of reflector panels or sections. The active system further includes an electric field radiator(s), conductors, substrate, software defined radio, control circuit, system circuits, and support systems. The passive system is constructed of fabrics selected from the group consisting of natural fibers, synthetic fibers, and reflective fabrics. The active communication system includes an antenna array (transceiver) and a software-defined radio (SDR), while the passive communication system comprises a reflective panel or sections and/or array of reflector panels or sections. The active system utilizes its SDR and transceiver to communicate back and forth with an onshore SDR and transceiver to provide information as necessary. The passive system receives a radar signal via the reflective material on the sail and reflects the signal back at the radar, which produces a radar cross section indicating that there is an object (in this case the sailboat) in the ocean.

Installation of highly reflective, passive materials into the sail provides a large reflector array that allows other ships to see the sailboat on their radar. On the active sails, installing an active antenna array with a software-defined radio (SDR) system permits the sail craft to broadcast a message or its position and its heading to others as an automatic identification system (AIS) or similar signal, further improving the safety of the ship and maritime environment.

According to an illustrative embodiment of the present disclosure, it is an object of the invention to provide a new and improved radar and communications enhanced sail that has all of the advantages of the prior art and none of the disadvantages.

According to a further illustrative embodiment of the present disclosure, it is an object of the invention to provide a new and improved radar and communications enhanced sail for a sailboat, sail ship, or sail drone.

According to yet another illustrative embodiment of the present disclosure, it is an object of the invention to provide a new and improved radar and communications enhanced sail that includes a first sail section comprising an active communication system, a second sail section comprising a passive communication system, or a combination thereof.

According to still another illustrative embodiment of the present disclosure, it is an object of the invention to provide a new and improved radar and communications enhanced sail that improves radar and RF-based visibility of a sailboat, particularly out at sea.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Generally, provided is a radar and communications enhanced sail for a sailboat, sail ship, or sail drone comprising: a first sail section comprising an active communication system; a second sail section comprising a passive communication system; wherein the active communication system comprises an antenna array and a software-defined radio; and wherein the passive communication system comprises a reflective panel or sections and/or array of reflector panels or sections. The active system further comprises an electric field radiator, conductors, substrate, software defined radio, control circuit, system circuits, and support systems, and the passive system is constructed of fabrics selected from the group consisting of natural fibers, synthetic fibers, and reflective fabrics.

Figure 1:
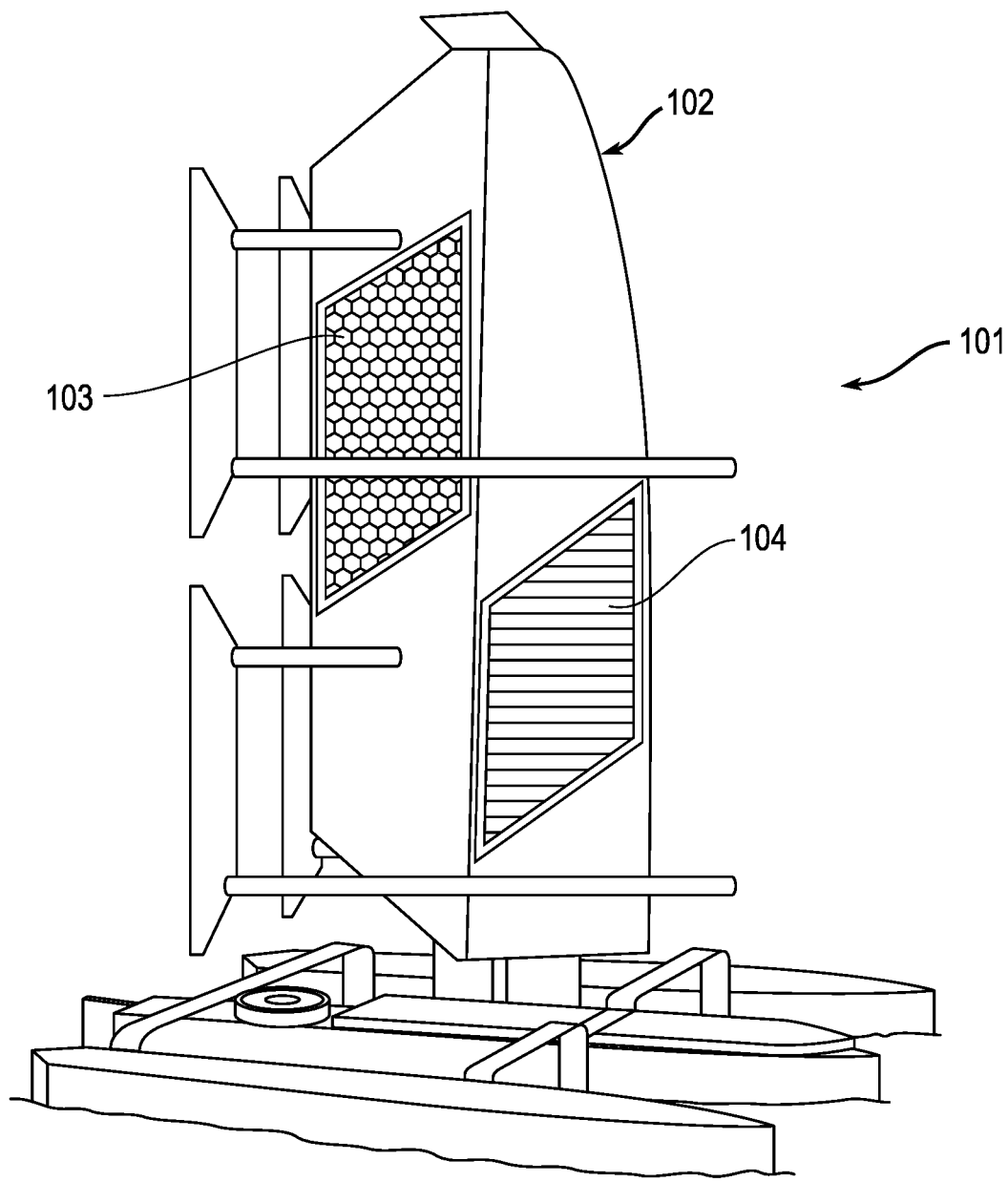
FIG. 1 shows a sailboat with cutaways in the sail depicting embedded active/passive radar elements.

FIG. 1 shows a sail boat 101 with cutaways in the sail 102 depicting embedded active section 103 and passive section 104 radar elements. The active 103 and passive 104 radar elements can be contained within a section of the sail 102 and covered by the sail 102 material, can be standalone sections of the sail 102, or can replace the entire conventional sail 102. The active 103 radar elements comprise a communications system, a software-defined radio (SDR), and an automatic identification system (AIS)-like system, which will be described in greater detail below. The passive 104 radar elements comprise a reflector system, which will be described in greater detail below.

Figure 2:
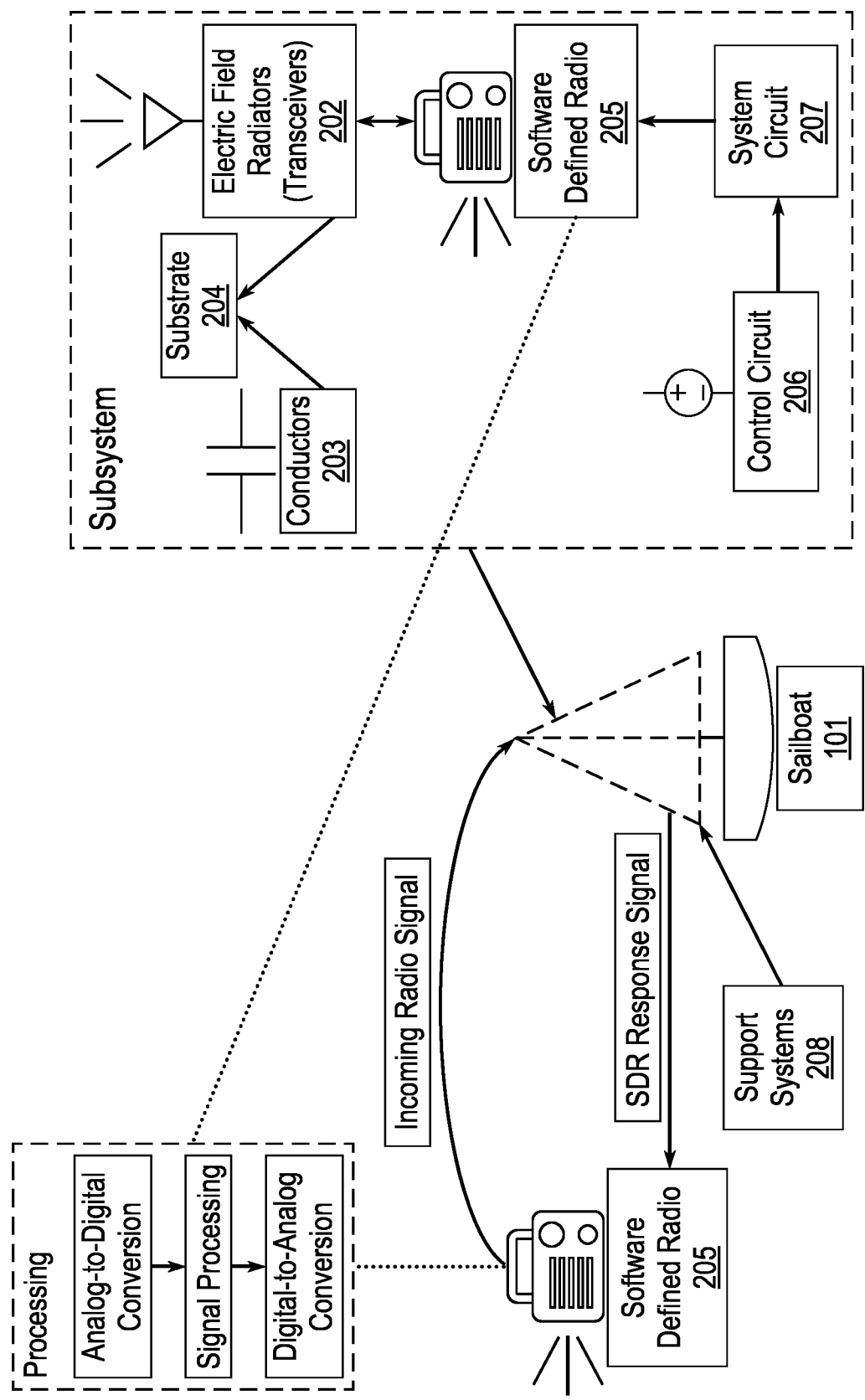
FIG. 2 shows a sailboat depicting the active system.

FIG. 2 shows a sailboat 101 depicting the active system. The active radar and communications enhanced sail section comprises an antenna array and a software-defined radio. In one embodiment, the active sail comprises an electric field radiator 202, conductors 203, substrate 204, a software defined radio 205, control circuit 206, system circuits 207, and support systems 208. In another embodiment, the software-defined radio further comprises hardware comprising BladeRF 2.0 xA4 SDR, Raspberry Pi 3, Wi-Fi Antenna, and software comprising GNU radio blocks.

There are several options for the active antenna system. In one illustrative embodiment, the active antenna system comprises a rectangular patch antenna created with PDMS as the substrate and copper foil for the antenna. In a second embodiment, the active antenna system comprises a microstrip antenna created with PDMS as the substrate and copper foil for the antenna. In a third embodiment, the active antenna system comprises an H-Tree antenna array created with PDMS as the substrate and copper foil for the antenna. In a fourth embodiment, the active antenna system comprises a bowtie antenna created with PDMS as the substrate and copper foil for the antenna. In a fifth embodiment, the active antenna system comprises a PIFA antenna array created with PDMS as the substrate and copper foil for the antenna. In another embodiment, the active antenna system comprises a bowtie antenna, which provides 360-degree directionality, an acceptable $S_{11}$ parameter value, and a bandwidth which allows for a suitable amount of error.

In an illustrative example, the SRD comprises a HackRF One system. In a second embodiment, the SDR comprises a BladeRF 2.0 micro xA4 system. As can be appreciated, the HackRF One is half duplex while the BladeRF 2.0 micro xA4 is full duplex. Several software choices exist for programming the SDRs: utilizing RTL-SDR Lib, GNU Radio, Pythol, Linux, and the like. RTL-SDR Lib is a library developed by Osmocom that can be paired with C++ or Python code. This library allows for complete control over SDRs by using callback functions provided in the library. In order to setup the SDR, there are several configuration settings that need to be considered. In particular, the library encompasses many different SDR models, which means the user must be fairly specific in their configurations and definitions. Another aspect of RTL-SDR Lib is that it contains very little supplement on data analytics, synthesizing signals, and signal modulation. GNU Radio is another library useful for SDR programming. This uses a different approach where the programming environment is reminiscent of MATLAB Simulink or LabView. This means that instead of calling library functions in C++ or Python, block functions are called within the GNU radio application. This is useful because it has a lot of supplementary materials provided to produce a GUI, analyze/parse data, encode, and synthesize signals. In the preferred embodiment, the active sail comprises a BladeRF 2.0 micro xA4 system and a GNU Radio.

Figure 3:
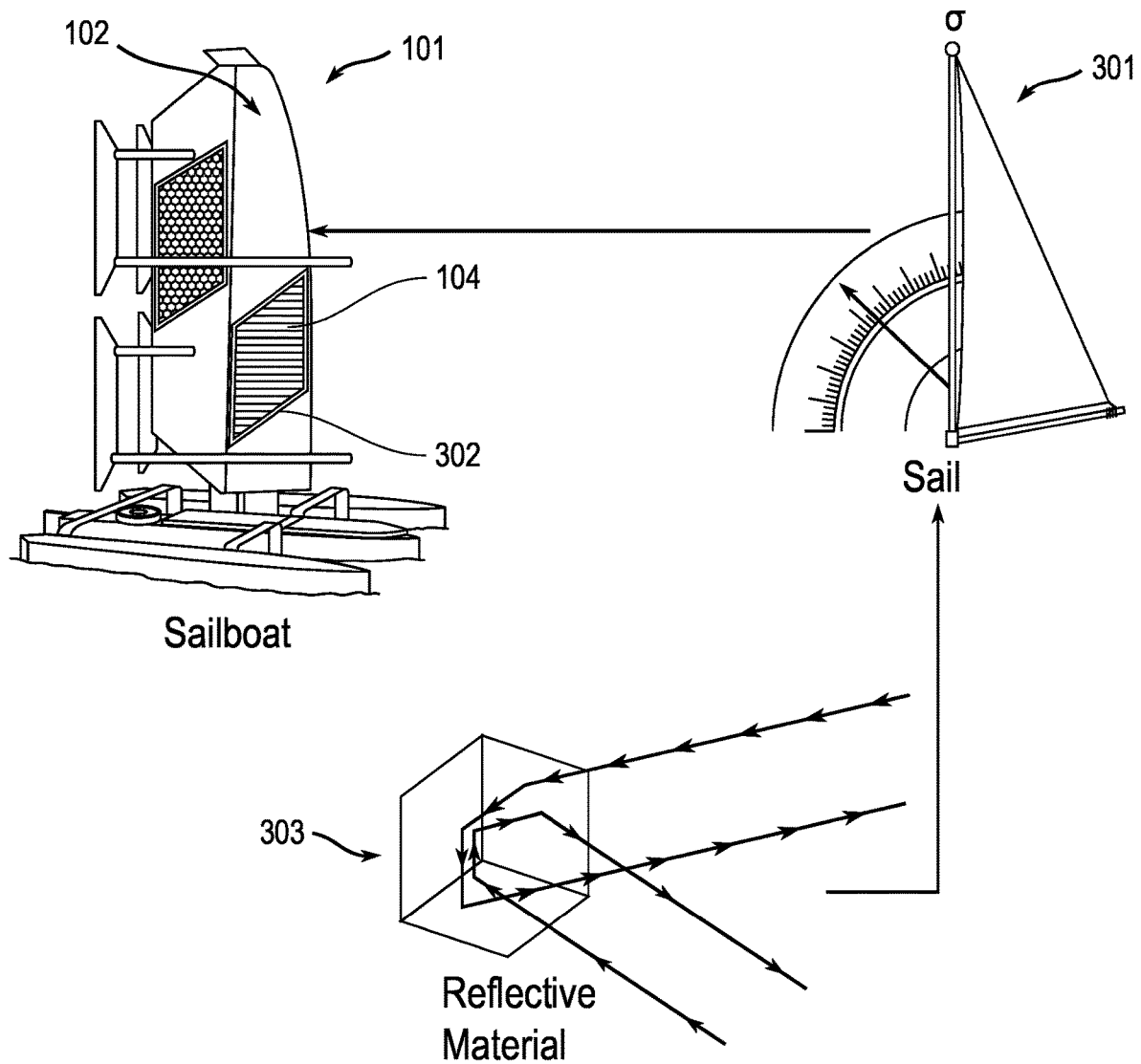
FIG. 3 shows a sailboat and sail depicting the passive system.

FIG. 3 shows a sailboat 101 and sail 102 depicting the passive system 104. The passive system 104 further is constructed of fabrics 301, such as natural fibers, synthetic fibers, and reflective fabrics and/or materials. In one embodiment the passive system 104 is constructed of fabrics 301 selected from the group consisting of natural fibers, synthetic fibers, and reflective fabrics. The conductive fabric is very flimsy, so a much stronger sail cloth 302 can be sewn onto the backside of the sail 102 for structural support. The exception to this design is the aluminum substrate, which is sturdy enough to work as a sail without the sail cloth backing. The passive system 104 acts as a large reflector. With this design, the ability of the sail to reflect radar signals 303 is maximized by the relatively large, planar geometry of the sail and the high conductivity of the materials used to build it.

The four main criterion considered for the passive sail 104 design include 1) Reflectivity; 2) Weight; 3) Flexibility; and 4) Water Resistivity. In one embodiment, the passive sail 104 comprises an aluminum substrate. In another illustrative example, the passive sail 104 comprises a copper nickel non-woven material. In another embodiment, the passive sail 104 comprises a silver, non-woven material.

The passive sail 104 will be constructed of a fabricated sail 102 on the sailboat 101. The passive system acts as a large reflector. Each conductive fabric design was fabricated on a separate sail 102 and tested individually. With this design, the ability of the sail 102 to reflect radar signals is maximized by the relatively large, planar geometry of the sail 102 and the high conductivity of the materials used to build it.

Figure 4:
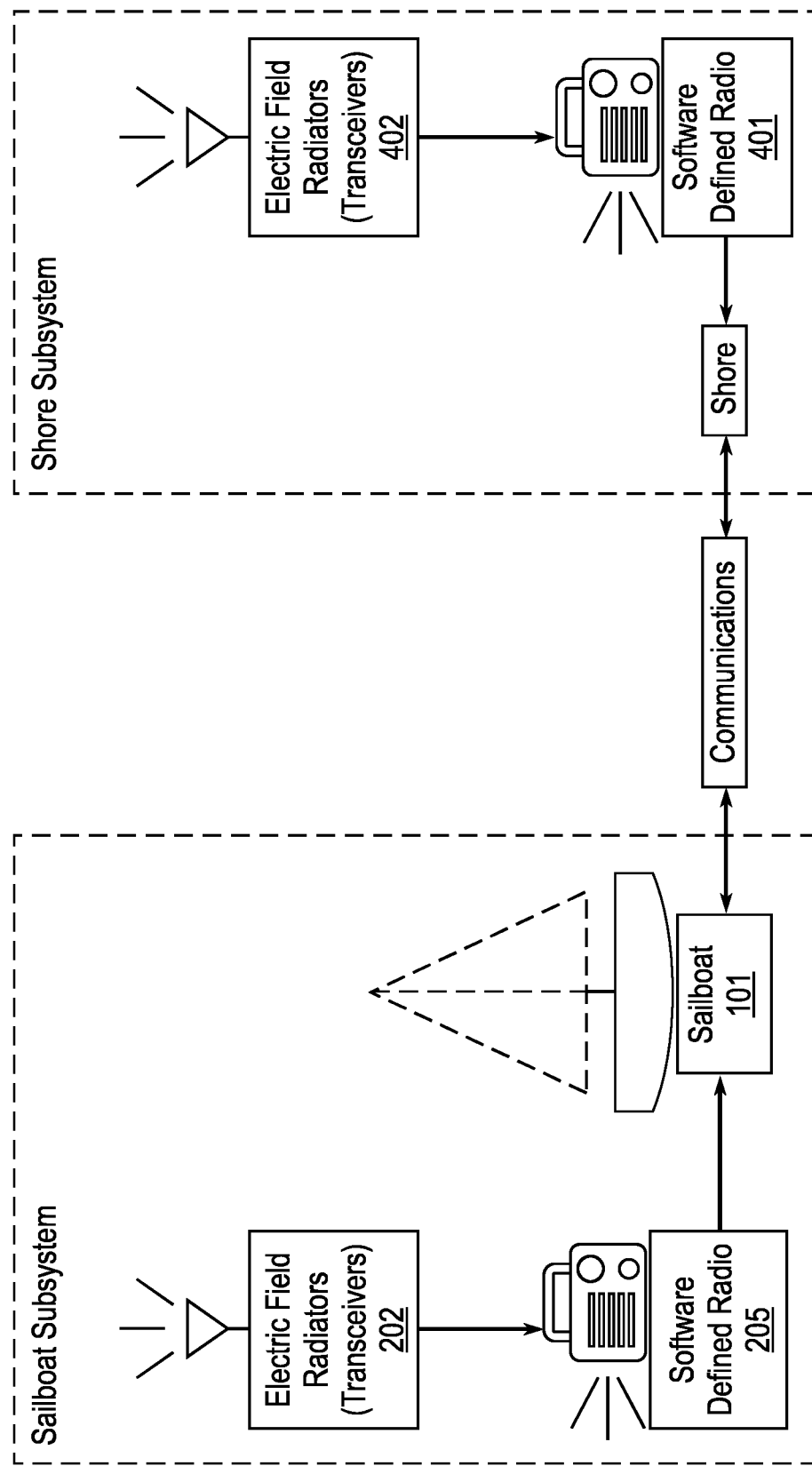
FIG. 4 shows the active system in use communicating to a shore subsystem.

FIG. 4 shows the active system in use communicating to a shore subsystem. The sailboat 101 comprises a software defined radio (SDR) 205 connected to an antenna or an electric field radiator (transceiver) 202. On the shore at a second location is a second SDR 401 and a second transceiver 402. As shown, the sailboat SDR 205 configuration will communicate with an SDR 401 configuration onshore. In this configuration, the systems will communicate back and forth with each other via the SDR 205, 401 and transceivers 202, 402 to provide information as necessary.

Figure 5:
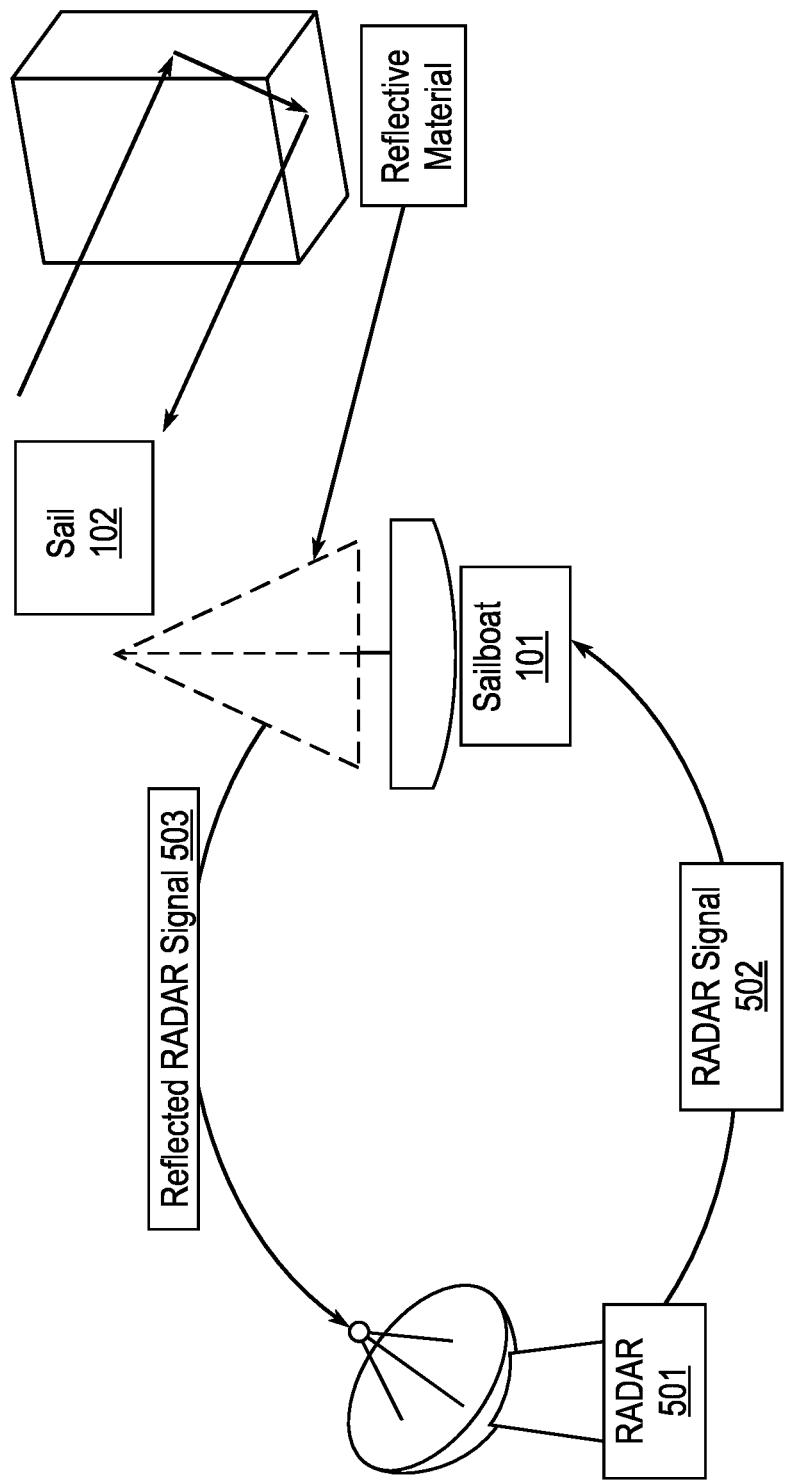
FIG. 5 shows how the passive sailboat configuration interacts with radar.

FIG. 5 shows how the passive sailboat 101 configuration interacts with radar 501. The radar 501 sends out a signal 502 in a conventional manner as it does its sweep. The signal 502 propagates through space and hits the reflective material on the sail 102. The signal 502 is then reflected, thereby creating a reflected signal 503 that is reflected back at the radar 501. The reflected signal 503 is received by the radar 501, which produces a radar cross section indicating that there is an object (in this case the sailboat 102) in the ocean.

Although the invention has been described in detail with reference to certain preferred embodiments, variations and modifications exist within the spirit and scope of the invention as described and defined in the following claims.

The invention claimed is:

1. A radar and communications enhanced sail for a sailboat, sail ship, or sail drone comprising:
    a first sail section comprising an active communication system;
    a second sail section comprising a passive communication system;
    a third sail section comprising of an combined active and passive communication system
    wherein said active communication system comprises an antenna array and a software-defined radio; and
    wherein said passive communication system comprises a reflective panel or sections and/or array of reflector panels or sections.

2. The radar and communications enhanced sail of claim 1, wherein said active system further comprises an electric field radiator(s), conductor(s), substrate(s), software defined radio(s), control circuit(s), system circuit(s), and support system(s).

3. The radar and communications enhanced sail of claim 1, wherein said passive system is constructed of fabrics selected from the group consisting of natural fibers, synthetic fibers, and reflective fabrics.

4. The radar and communications enhanced sail of claim 3, wherein said passive system fabrics comprise sail cloth sewn onto a backside for structural support.

* * * * *